United States Patent [19]

Gowing

[11] 4,092,788
[45] June 6, 1978

[54] CARDIOPULMONARY RESUSCITATION TEACHING AID

[75] Inventor: Ellis Gowing, Topeka, Kans.

[73] Assignee: St. Francis Hospital, Inc., Topeka, Kans.

[21] Appl. No.: 809,152

[22] Filed: Jun. 23, 1977

[51] Int. Cl.² .............................................. G09B 23/28
[52] U.S. Cl. ........................................ 35/17; 128/28
[58] Field of Search ............ 35/17, 29 B, 29 C, 29 D, 35/29 E; 272/109, 144; 297/384; 128/28; 33/174 D; 273/55 R, 55 A

[56] References Cited

U.S. PATENT DOCUMENTS

| 2,673,737 | 3/1954 | Daniels ............................ 272/144 X |
| 3,173,415 | 3/1965 | Rubin .............................. 272/109 X |
| 3,219,031 | 11/1965 | Rentsch ........................... 128/28 X |
| 3,659,844 | 5/1972 | Cummins ......................... 272/109 X |
| 3,736,362 | 5/1973 | Laerdal ................................. 35/17 |
| 3,857,561 | 12/1974 | Cecchettini ..................... 272/109 X |

FOREIGN PATENT DOCUMENTS 969,883  2/1950  France ................................ 297/384

Primary Examiner—Harland S. Skogquist
Attorney, Agent, or Firm—Lowe, Kokjer, Kircher, Wharton & Bowman

[57] ABSTRACT

A CPR trainer having a patient underlying base frame with a pair of vertically projecting arms. Adjustable shoulder pads extend from the arms above the base for contact with the rescuer's shoulders and adjustable elbow braces also extend from the arms above the base for the contact with the backside of the rescuer's elbows.

9 Claims, 4 Drawing Figures

CARDIOPULMONARY RESUSCITATION TEACHING AID

BACKGROUND AND SUMMARY OF THE INVENTION

During the mid 1960's, numerous health organizations began endorsing cardiopulmonary resuscitation (referred to as CPR) has practical emergency life support for victims of cardiac arrest. Cardiopulmonary resuscitation is simply artificial circulation induced by external cardiac massage and requires no equipment other the rescuer's hands. When pressure is applied to the sternum (breastbone), the heart is compressed against the spine, forcing blood from the heart into the arteries and pulmonary veins. Relaxation of pressure on the sternum allows the heart to fill with venous blood for a subsequent compression.

Heart attack cases frequently involve both cardiac and respiratory arrest. When used in conjunction with artificial respiration such as mouth-to-mouth breathing at a recommended rate of 12 ventilations per minute, promptly administering CPR at a recommended rate of 60 compressions per minute has proven highly successful in resuscitating heart attack victims.

Since cardiac arrest normally strikes suddenly, the victim is totally dependent upon those friends or relatives around him at the time of the attack to take speedy, effective action. Lay personnel can readily be taught the life saving CPR procedure because no specialized equipment is necessary. Consequently, medical societies and health organizations are hopeful the public will become widely educated and skillful of CPR as basic emergency first aid.

As in other emergency first aid measures, CPR must be timely and proficiently administered. When performed properly, CPR treatment can save lives which might otherwise be lost. When performed improperly, however, external cardiac compression can result in rib fractures, separation of rib cartilage, fracture of the sternum, lung contusions, and lacerations of the heart and liver. The risk of these complications can of course be minimized by appropriate attention to the details of performance and, consequently, practitioners of this rescue skill must be thoroughly trained to master the correct technique.

Heretofore, CPR training has been accomplished principally by demonstration. The trainee typically practices CPR on a manikin while an instructor is available to correct the student's body positions and movements. There is a need, however, for a training aid to assist students of the CPR technique in learning the proper body positions and movements, while developing the necessary timing and coordination through repetitive practice. The primary goal of this invention is to fulfill this need.

More specifically, an object of the invention is to provide a CPR trainer to facilitate the teaching of cardiopulmonary resuscitation by requiring the student to maintain correct body positions during compression and relaxation cycles.

Another object of the invention is to provide a CPR trainer to assist a trainee in maintaining his shoulders in proper alignment above a heart attack victim during the compression and relaxation strokes of the CPR method.

An additional object of the invention is to provide a CPR trainer to correctly position the student's arms and to maintain such position while practicing the CPR technique.

Yet another object of the invention is to provide a CPR trainer to assist the student through self-help in the correct positioning and alignment of his torso and arms while practicing a rhythmic rocking motion of the hips to effect the compression and relaxation strokes of the CPR method.

A further object of the invention is to provide a CPR trainer to enable a student to correctly practice the proper CPR technique and thereby develop rhythm and timing without the need of constant supervision by an instructor. Thus, a single qualified instructor can supervise the training of several persons at the same time, each operating with the CPR trainer and a practice manikin. As a corollary advantage, the trainer enables the CPR practitioner to periodically check on his own technique and to further develop skill at his convenience to insure a satisfactory level of proficiency.

A supplemental object of the invention is to provide a CPR trainer of the character described which is readily adjustable to persons of varying body size and physical characteristics.

Yet a further object of the invention is to provide a CPR trainer of the character described, being of a durable and rugged construction, which may be readily and economically fabricated.

Other and further objects of the invention, together with the features of novelty appurtenant thereto, will appear in the course of the following description of the drawing.

DESCRIPTION OF THE DRAWING

In the accompanying drawing, which forms a part of the specification and is to be read in conjunction therewith, and in which like reference numerals are employed to indicate like parts in the various views.

Figure 1:
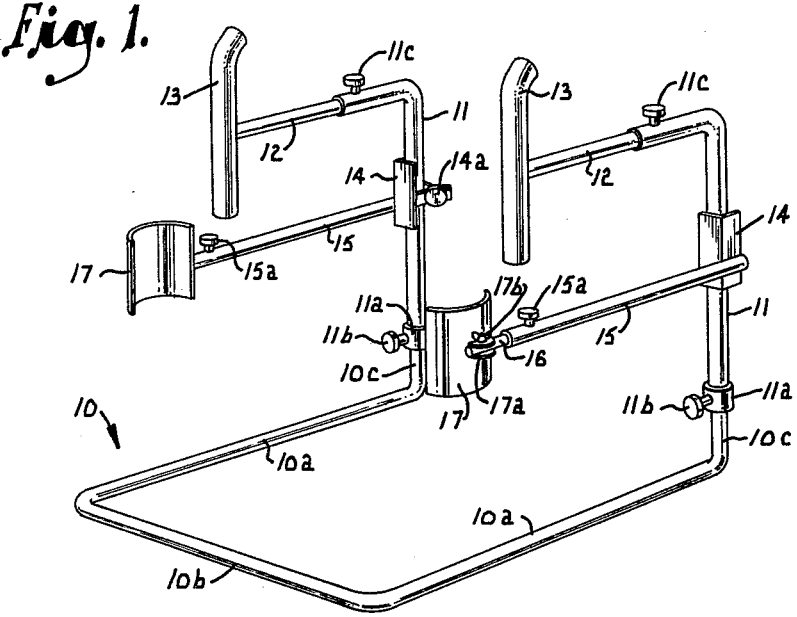
FIG. 1 is a prospective view of a cardiopulmonary resuscitation training aid constructed in accordance with a preferred embodiment of the invention.

Referring to the drawing in greater detail, attention is initially directed to FIG. 1. The CPR trainer includes a support frame or base 10 comprising a pair of spaced apart parallel legs 10a integrally joined at the forward ends thereof by a cross member 10b. Integrally formed with the rearward ends of the legs 10a are extensions 10c which are upturned to a vertical position. The lower ends of inverted L-shaped tubular arms 11 are telescopically received on the extensions 10c of the base. A sleeve 11a attached to the arm 11 is tapped and threaded with a thumbscrew 11b to lock the arm 11 at an appropriate height and attitude with respect to the base 10. The upper ends of the arms 11 project forwardly over the base 10 and telescopingly receive rods 12 having substantially vertical shoulder pads 13 mounted on the forward ends thereof. The arms 11 are likewise tapped and threaded for thumbscrews 11c for adjusting the lateral and angular position of the shoulder pads 13.

Along the vertical extent of the arms 11 are mounted clamping brackets 14 equipped with thumbscrews 14a so that the brackets 14 may be adjusted along the height of the arms 11 and may also be turned inwardly or outwardly. Attached to the clamping brackets 14 and projected forwardly over the base 10 are tubular sleeves 15 which telescopingly receive smaller diameter rod or tubing extensions 16. The sleeves 15 are tapped and threaded for thumbscrews 15a to adjustably vary the extensible and angular positions of the extensions 16. The outer ends of the extensions 16 carry elbow guides 17 formed as cylindrically curved plates having a pair of ears 17a on the backside thereof. A bolt and adjustable wingnut 17b mounts each elbow guide 17 for limited pivotal movement with respect to the extension 16. Tightening the wingnut 17b locks the elbow guide 17 in a selected position.

In use, the CPR trainer can specifically be utilized in the following manner. First, the base 10 of the CPR trainer is placed under the chest region from the side of the patient or practice manikin 10. The trainee or operator 19 then kneels on the opposite side of the patient 18 with his knees just touching or spaced slightly out from the cross member 10b of the base 10. At this point it may be necessary to adjust the trainer to the physical size and characteristics of the trainee and a qualified instructor in the CPR method will be of assistance in initially positioning the trainee correctly. For example, the height of the shoulder pads 13 above the base 10 may be varied by loosening the thumbscrews 11b and then raising or lowering the arms 11 on the extensions 10c or turning the arms 11 inwardly or outwardly to accommodate the shoulders of the trainee. Thereafter the thumbscrews 11b may be tightened to lock the arms 11 in position. The adjustment screws 11c permit altering the position of the shoulder pads 13 which should extend over the base 10 to a location such that when the trainee 19 contacts the shoulder pads 13, the axis of his shoulders is in vertical alignment above the patient's sternum. Although it is preferable that the shoulder pads 13 be oriented substantially vertical, they may be tilted slightly for the comfort of the trainee and then the adjustment screws 11c can be tightened to lock the shoulder pads 13 in place.

Figure 4:
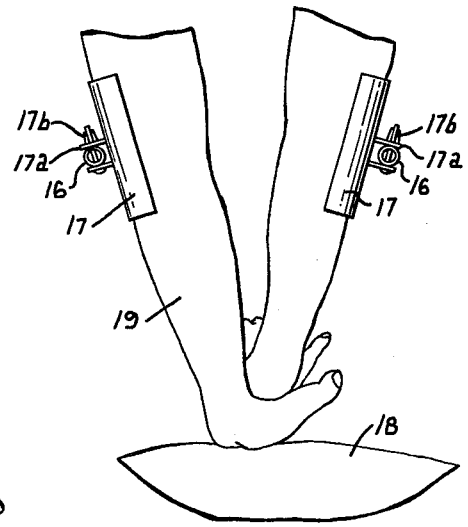
FIG. 4 is an end elevational view taken along line 4—4 of FIG. 2 in the direction of the arrows illustrating the elbow guides retaining the student's elbows to maintain proper position and alignment of the arms.

After adjustment of the shoulder pads 13, the student places the heel of one hand directly on the patient's sternum approximately two fingers' width above the xiphoid (tip of the sternum) and places his other hand on top of the first (FIG. 4) with the elbows of both arms locked straight. The instructor may then position the elbow guides 17 behind the student's elbows. Such adjustment may include loosening the clamping brackets 14 to vary the heighth of the elbow guides 17 above the base 10 or to pivot them inwardly or outwardly. Similarly, the adjustment screws 15a on the sleeves 15 may be loosened to vary the extension of the elbow guides 17 from the support arms 11 or to pivot the guides 17 to mate with the slope of the trainee's arms. Finally, the wingnuts 17b holding the elbow guides 17 on the extensions 16 may be loosened to vary the region of contact with the trainee's arm. The purpose of these adjustments therefore is to insure that the elbow guides 17 are positioned directly behind the student's elbows so that his arms will remain straight.

Figure 2:
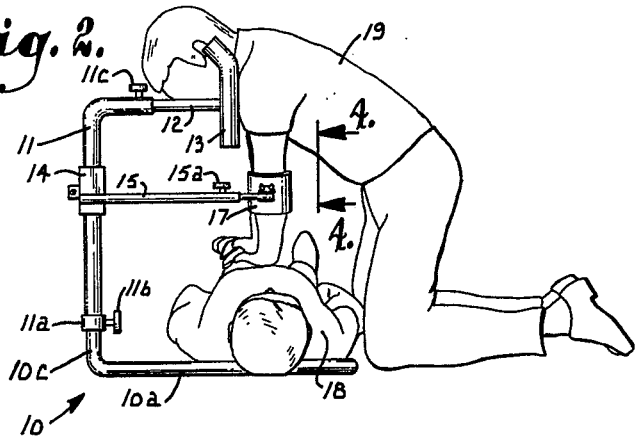
FIG. 2 is a side elevational view of the CPR trainer shown in use with a trainee properly positioned over a patient demonstrating the relaxation stroke of the CPR method.
Figure 3:
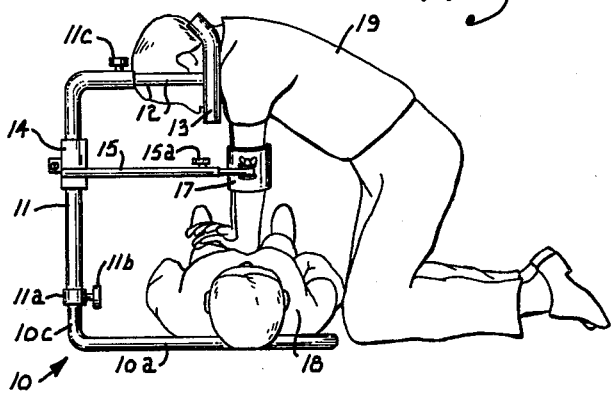
FIG. 3 is a side elevational view of the CPR trainer shown with the trainee demonstrating the compression stoke of the CPR method.

With the CPR trainer properly adjusted to the physical characteristics of the trainee, the trainee is instructed to maintain his shoulders in contact with the shoulder pads 13 at all times during practice of the method and to maintain his arms straight by locking the elbows. From such position as shown in FIG. 2, a compression stroke is accomplished by moving the hips slightly outwardly (to the rear) and the trainee's upper weight is thus transmitted through the arms as a direct vertical force on the patient's sternum to cause a compression from 1½ to 2 inches (FIG. 3). To relax from the compression stroke, the rescuer simply moves his hips inwardly, causing the shoulders to rise and relieving weight from the patient.

The student will of course repeat the compression and relaxation strokes numerous times to develop the proper timing, rhythm and coordination to sustain the rescue effort at the recommended rate of 60 compressions per minute. While practicing this technique, the CPR trainer enables the student himself to detect any errors that may be made. If, for example, the student's shoulders break contact with the shoulder pads 13 during a compression or relaxation stroke, the student is immediately aware his body movements are improper. Likewise, if the elbows bear against the elbow guides 17 with increased pressure, the student can recognize he is displaying poor form in keeping his arms straight. Accordingly, the CPR trainer is a valuable aid in teaching correct body positions and enables students to more rapidly develop the correct rhythm and timing needed for cardiopulmonary resuscitation.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A cardiopulmonary resuscitation training aid comprising:
   a planar base;
   vertical support means connected to said base at the periphery thereof and extended upwardly therefrom;
   a pair of spaced apart, shoulder contact members connected to said vertical support means and projected outwardly therefrom over the plane of said base; and
   a pair of spaced apart, elbow brace members connected to said vertical support means and projected outwardly therefrom over the plane of said base intermediate said shoulder contact members and said base.

2. The training aid as in claim 1 including adjustment means interconnecting said vertical support means and said shoulder contact members to vary the height of said contact members above said base.

3. The training aid as in claim 1 including adjustment means interconnecting said vertical support means and said shoulder contact members to vary the distance of said contact members from said vertical support means.

4. The training aid as in claim 1 including adjustment means interconnecting said vertical support means and said shoulder contact members to vary the distance between said contact members.

5. The training aid as in claim 1 including adjustment means interconnecting said vertical support means and said elbow brace members to vary the height of said brace members above said base.

6. The training aid as in claim 1 including adjustment means interconnecting said vertical support means and said elbow brace members to vary the distance of said brace members from said vertical support means.

7. The training aid as in claim 1 including adjustment means interconnecting said vertical support means and said elbow brace members to vary the distance between said brace members.

8. The training aid as in claim 1 including adjustment means interconnecting said vertical support means and said elbow brace members to vary the attitude of said brace members with respect to the plane of said base.

9. The training aid as in claim 1 including adjustment means interconnecting said vertical support means and said elbow brace members to permit limited pivotal movement of said brace members.

* * * * *